(12) United States Patent
Kettler et al.

(10) Patent No.: US 6,805,394 B2
(45) Date of Patent: Oct. 19, 2004

(54) LOCKING MECHANISM FOR A SEAT FRAME

(75) Inventors: Andrea Kettler, Hannover (DE); Klaus-Dieter Habedank, Stadthagen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 10/339,830

(22) Filed: Jan. 10, 2003

(65) Prior Publication Data

US 2003/0160471 A1 Aug. 28, 2003

(30) Foreign Application Priority Data

Feb. 22, 2002 (DE) .......................................... 102 07 372

(51) Int. Cl.[7] .............................................. B60N 2/015
(52) U.S. Cl. .................... 296/65.05; 297/326; 297/336; 248/503.1
(58) Field of Search .......................... 296/65.01, 65.05; 297/326, 335, 336; 248/503.1

(56) References Cited

U.S. PATENT DOCUMENTS

| | | | |
|---|---|---|---|
| 4,114,947 A | | 9/1978 | Nelson ........................ 297/344 |
| 5,620,225 A | * | 4/1997 | Harry ............................ 296/63 |
| 5,697,727 A | * | 12/1997 | Harry ........................... 403/325 |
| 6,129,324 A | * | 10/2000 | Blanchard ................. 248/503.1 |
| 2002/0067045 A1 | * | 6/2002 | Blanchard ................... 292/252 |

FOREIGN PATENT DOCUMENTS

| | | | | |
|---|---|---|---|---|
| DE | 1692771 | | 1/1965 | |
| DE | 2317926 | | 4/1973 | |
| DE | 9501940 | | 11/1995 | |
| EP | 750087 | * | 6/1995 | |
| FR | 1032084 | * | 6/1953 | ............. 296/65.05 |
| FR | 2786520 | * | 6/2000 | |
| FR | 2793199 | * | 11/2000 | |
| FR | 2803866 | * | 7/2001 | |
| FR | 2828594 | * | 6/2002 | |
| FR | 2820449 | * | 8/2002 | |
| GB | 2272251 | * | 5/1994 | ............. 248/503.1 |
| JP | 406171413 | * | 6/1994 | ................ 297/336 |
| WO | WO 9941102 | | 8/1999 | ...................... 2/20 |

OTHER PUBLICATIONS

Germany Examination Report dated Sep. 26, 2002 –translation included.

* cited by examiner

Primary Examiner—Dennis H. Pedder
(74) Attorney, Agent, or Firm—Bourque & Associates

(57) ABSTRACT

A locking mechanism for a foldable seat frame pivotable about a forward pivot axis attached to a chassis is provided. The rear area of the seat frame may be secured in a locked position by means of a stop bolt that passes through an opening attached to the chassis and by means of spreader devices that may move radially inward and outward and that engage behind the edge of the opening. A displacement body for the spreader bodies may be displaced by means of an actuation lever pivotable on the rear area of the seat frame in such a manner that the spreader bodies may be so radially displaced inwards that they lie within the outer shape of the stop bolt in an unlocked condition. The actuation lever is mounted so that it may be displaced longitudinally against the force of the securing spring, and so that a pivoting motion to release the stop bolt is only possible upon longitudinal displacement against the direction of vehicle travel overcoming the force of the spring.

9 Claims, 5 Drawing Sheets

LOCKING MECHANISM FOR A SEAT FRAME

TECHNICAL FIELD

The invention relates generally to a locking mechanism, and more specifically to a locking mechanism for a seat frame.

BACKGROUND INFORMATION

With a locking mechanism device of a known type such as disclosed in DE 695 01 940 T2, a stop bolt is provided which is locked into an opening in a vehicle chassis via spreading devices actuated by an actuation lever. The stop bolt is attached to the seat frame so that it may pivot. In order to prevent unintentional pivoting of the stop bolt with respect to the seat frame when the seat frame is unlocked, an additional plunger pin is provided that blocks the pivot axis of the stop bolt. Nothing, however, is provided to prevent unintentional release of the locking mechanism, which might be caused by unsecured cargo items behind the automobile seat. Unintentional release is hazardous for the seat occupant.

SUMMARY OF THE INVENTION

Based on this state of the art, it is a goal of the present invention to create a locking mechanism of the known type which cannot be released unintentionally.

The invention features a locking mechanism for a seat frame attached to the chassis of, for example, an automobile which may pivot about a forward horizontal axis. Although the present invention will be explained with regard to an automobile seat and chassis, this is not a limitation of the present invention. The rear area of the seat frame may be fixed by means of a stop bolt that engages an opening attached to the chassis in a locked condition and by means of spreader devices that may move radially inward and outward and that engage behind the opening. A displacement body for the spreader bodies may be displaced by means of an actuation lever pivotable on the rear area of the seat frame in such a manner that the spreader bodies may be radially displaced inwards whereby they lie within the outer shape of the stop bolt in an unlocked condition. The actuation lever is mounted so that it may be displaced longitudinally against the force of the securing spring, and so that a pivoting motion to release the stop bolt is only possible upon longitudinal displacement against the direction of vehicle motion overcoming the force of the spring.

In order to release the seat lock, forces must be exerted on the actuation lever in two different directions. Simultaneously, counter-spring force along the direction of vehicle travel must be overcome.

Advantageous embodiments of the invention result from the dependent claims recited herein.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
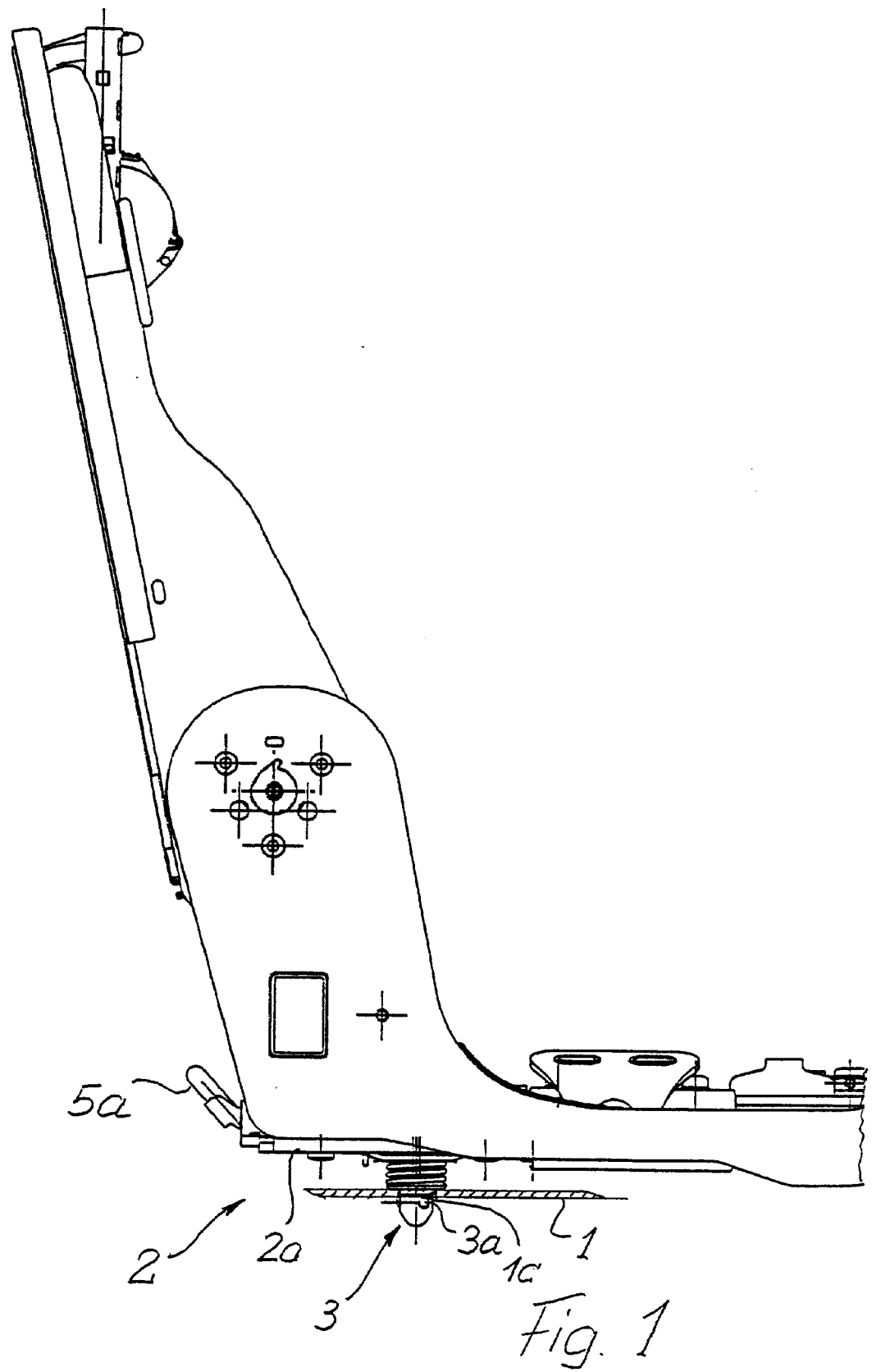
FIG. 1 is a side view of the seat-back area of a seat frame of an automobile seat.
Figure 2:
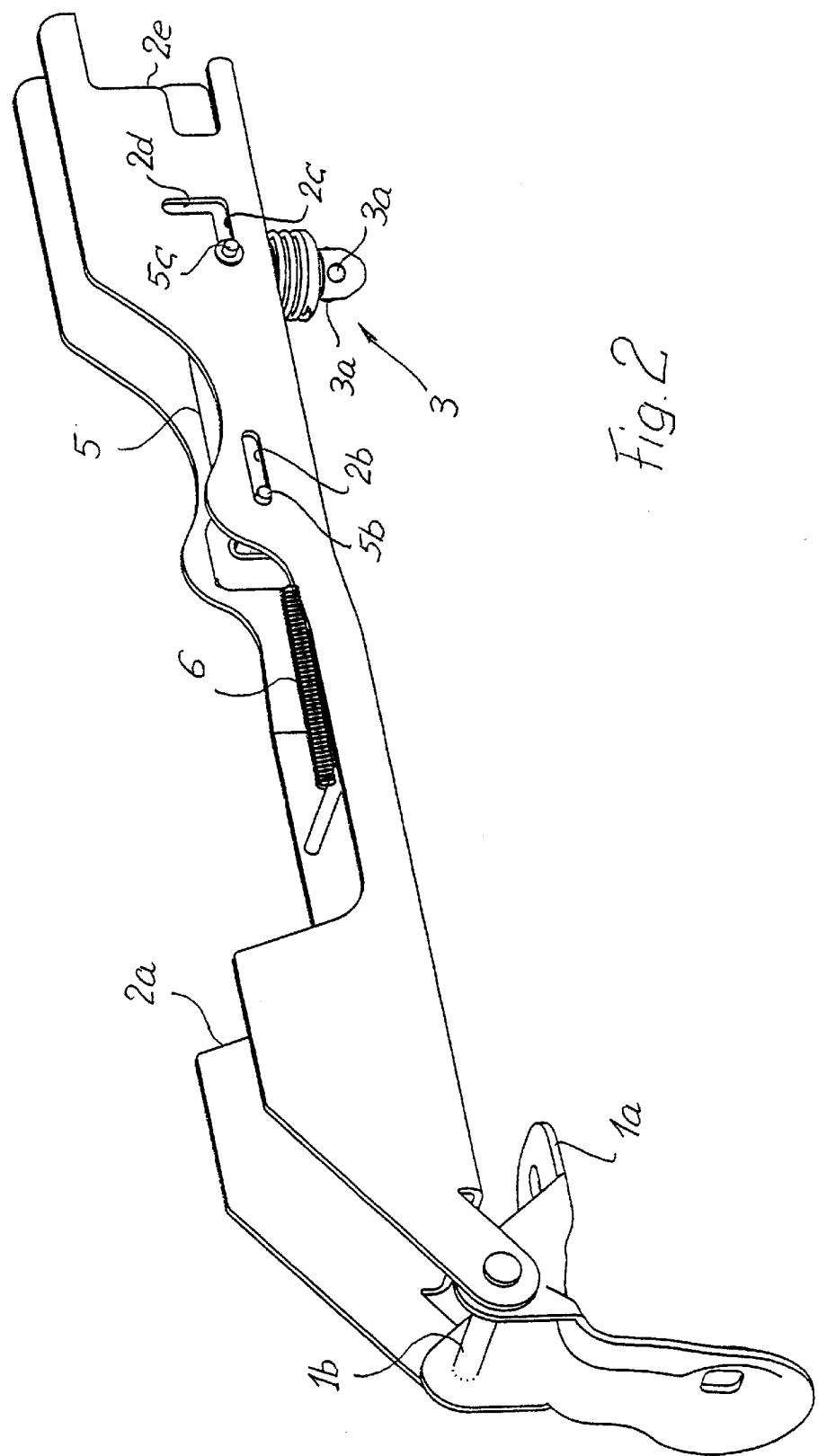
FIG. 2 is a perspective view of a foldable and lockable longitudinal spar of the seat frame in FIG. 1.

FIG. 1 shows a seat frame 2 of a rear seat area of an automobile seat, particularly a rear seat. In this area, the seat includes a swivel fixed pivot bracket 1a pivotable about a pivot axis 1b (see FIG. 2) and locked to the chassis 1 in its use position. Two stop bolts 3 per seat engage in openings 1c in the chassis and whose spreader devices 3a engage behind the opening 1c are preferably used to lock it. The locking mechanism is released using a grip 5a belonging to an actuation lever 5.

The seat frame 2 includes a longitudinal spar 2a on each of its longitudinal sides onto which an actuation lever 5 is mounted. The two actuation levers 5 may be connected together via a grip 5a. Each actuation lever 5 includes a pivot bearing journal 5b on its end facing away from the grip 5a. The pivot bearing journals 5b respectively extend through a slot opening 2b in the faces of the longitudinal spars 2a extending vertically. A follower tappet 5c is provided on the actuation lever 5 at a distance from the pivot bearing journal 5b. The follower tappet 5c is also located in a horizontal slot opening 2c when the seat frame 2 is in locked condition. A connecting link area 2d is adjacent to the slot opening 2c of the follower tappet 5c. This area extends approximately perpendicular to the slot opening 2c and enables pivoting of the actuation lever 5. The actuation lever 5 is pre-tensioned in the direction of the pivot axis 1b by a securing spring 6.

Figure 3:
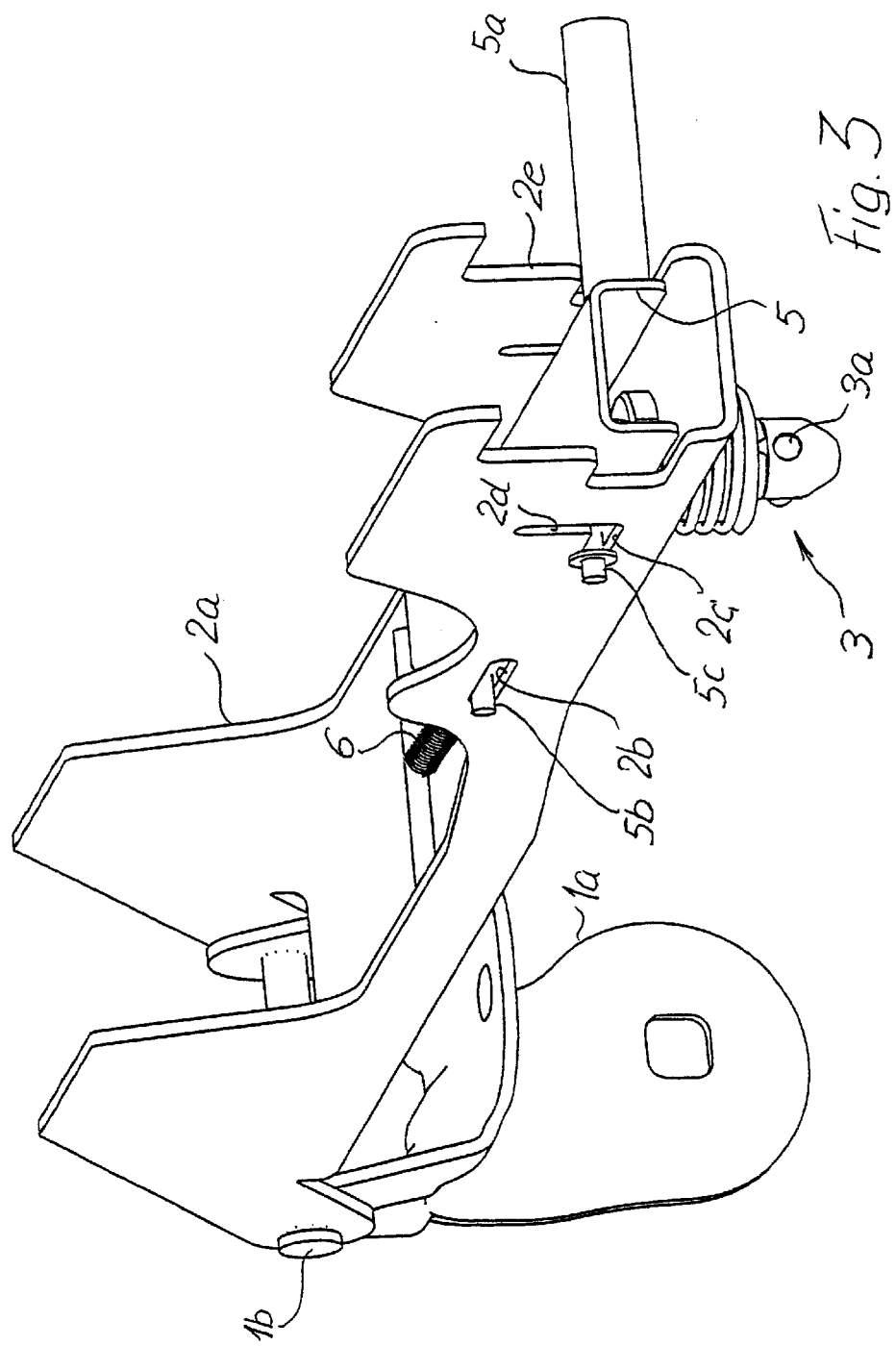
FIG. 3 is a perspective view of the longitudinal spar in FIG. 2 seen obliquely from the rear.

The slot openings 2b and 2c allow limited longitudinal displacement of the actuation lever 5 with respect to the seat frame 2. Pivoting the actuation lever 5 is only possible if the pivot bearing journal 5b in FIG. 3 has achieved its right-hand end position. This longitudinal movement of the actuation lever 5 is supported by the connecting link surfaces 2e on the longitudinal spar 2a, along which the grip 5a is displaced.

Figure 4:
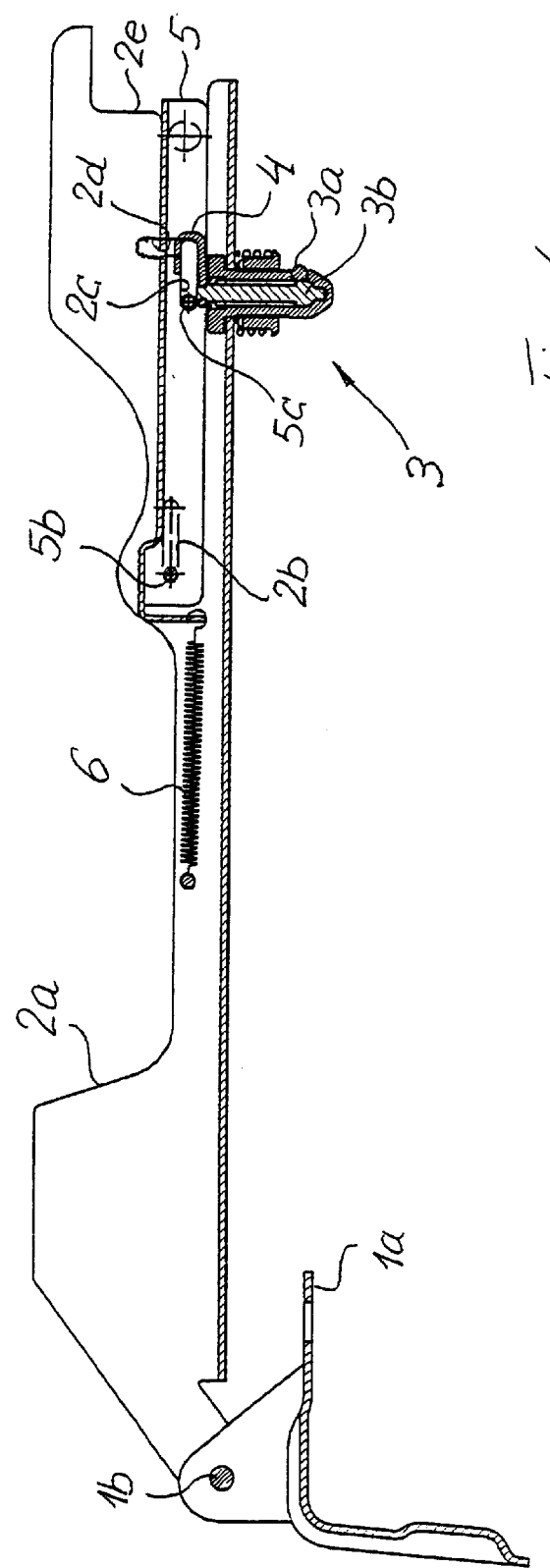
FIG. 4 is a longitudinal cross-sectional view through the longitudinal spar in FIG. 2 with the lock engaged.
Figure 5:
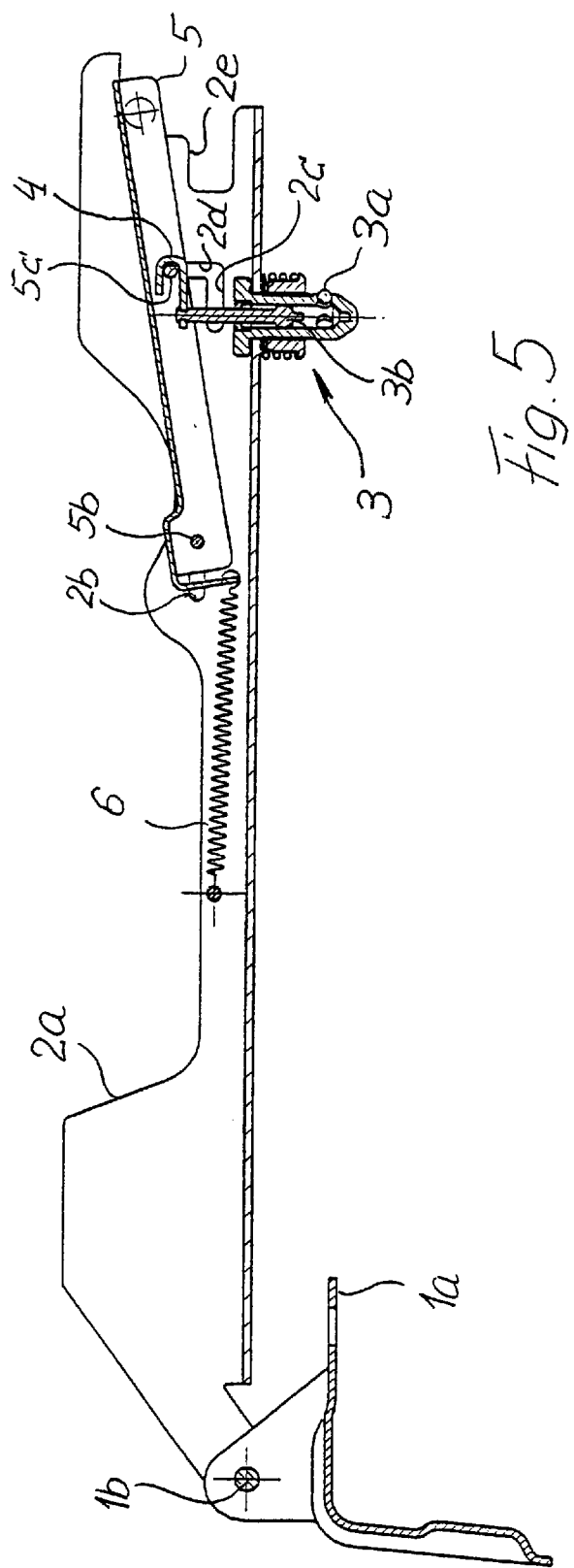
FIG. 5 is a longitudinal cross-sectional view similar to FIG. 4 with the lock released.

In a locked condition, as shown by FIG. 4, the spring 6 holds the actuation lever 5 displaced to the left-hand position in which the follower tappet 5c is located in the slot opening 2c. The actuation lever 5 can therefore not pivot. At the same time, the follower tappet 5c is located over a longitudinal guide 4 formed by a bent plate that is firmly attached to a known type of displacement body 3b for the spreader body 3a. The displacement body 3b can therefore not be displaced from its locked position in which it displaces the spreader body 3a over the radius of the opening 1c as a result of shaking or vibration. An area of the grip 5a extending horizontally also lies below a part of a connecting link surface 2e (this part of the connecting link surface 2e is best seen in FIG. 5) that extends horizontally. Also, pivoting of the actuation lever 5 is thus prevented.

When the actuation lever 5 is pulled out against the force of the spring 6, the follower tappet 5c moves into the end of the slot opening 2c adjacent to the connecting link area 2d. Thus, the follower tappet 5c ends up in the enclosed area of the longitudinal guide 4. The actuation lever 5 may now be pivoted, as FIG. 5 shows, whereby the follower tappet 5c in the connecting link area 2d moves upward and brings the displacement body 3b along with the longitudinal guide 4, and the horizontal grip 5a slides along the vertical area of the connecting link surface 2e (this vertical area of the connecting link surface 2e is best seen in FIG. 4). The spreader bodies 3a are thus released and can be displaced inward through the opening edge into the stop bolt 3 by raising them. Thus, the stop bolt 3 may be raised out of the opening 1c to pivot the seat frame 2 about the pivot axis 1b.

Intentional displacement of the actuation lever 5 against the force of the securing spring 6 and subsequent pivoting is also excluded in the event of a crash. Unintentional release of a normally-locked automobile seat is thus reliably prevented.

Modifications and substitutions by one of ordinary skill in the art are considered to be within the scope of the present invention which is not to be limited except by the claims which follow.

What is claimed is:

1. A locking mechanism for a seat frame (2) attached to a chassis (1) that may pivot about a forward horizontal axis (1b) comprising:
    a rear area (1c) of said seat frame fixable to said chassis (1) in a locked position by means of a stop bolt (3) that engages an opening (1c) attached to the chassis (1);
    spreader devices (3a) that may move radially inward and outward and that engage behind the opening (1c); and
    a displacement body (3b) for the spreader bodies (3a) displaceable by means of an actuation lever (5) pivotable on the rear area of the seat frame (2) in such a manner that the spreader bodies (3a) may be radially displaced inwards to lie within the outer shape of the stop bolt (3) in an unlocked condition, wherein the actuation lever (5) is mounted so that it may be displaced longitudinally against the force of a securing-spring (6), and so that a pivoting motion to release the stop bolt (3) is only possible upon longitudinal displacement of the actuation lever (5) against the direction of vehicle motion overcoming the force of the spring.

2. The locking mechanism as in claim 1, wherein the displacement body (3b) is connected with the actuation lever (5) along a longitudinal guide (4).

3. The locking mechanism as in claim 1, wherein the actuation lever (5) includes a pivot bearing journal (5b) and a follower tappet (5c), both of which engage in slot openings (2b; 2c) in the seat frame 2, whereby a connecting link area (2d) is adjacent to the slot opening (2c) of the follower tappet (5c) that allows the actuation lever (5) to pivot to release the lock.

4. The locking mechanism as in claim 3, wherein the connecting link area (2d) extends crosswise to a longitudinal dimension of the slot opening (2c).

5. The locking mechanism as in claim 2, wherein the longitudinal guide (4) is formed by a plate extending crosswise to a displacement direction that is bent on its rear end about a part of the longitudinal guide (4) along the direction of vehicle travel.

6. The locking mechanism as in claim 1 wherein two actuation levers (5) for adjacently-positioned stop bolts (3) each are connected to a common grip (5a) extending crosswise to the direction of vehicle travel.

7. The locking mechanism as in claim 6, wherein the common grip (5a) is formed to slide along connecting link surfaces (2e) of the seat frame (2).

8. The locking mechanism as in claim 3 wherein the slot openings (2b; 2c) extend horizontally.

9. The locking mechanism as in claim 1, wherein said chassis includes an automobile chassis.

* * * * *